Jan. 6, 1942.   L. A. HENDRICKSON   2,268,548
INNER TUBE TESTER
Filed Aug. 11, 1941
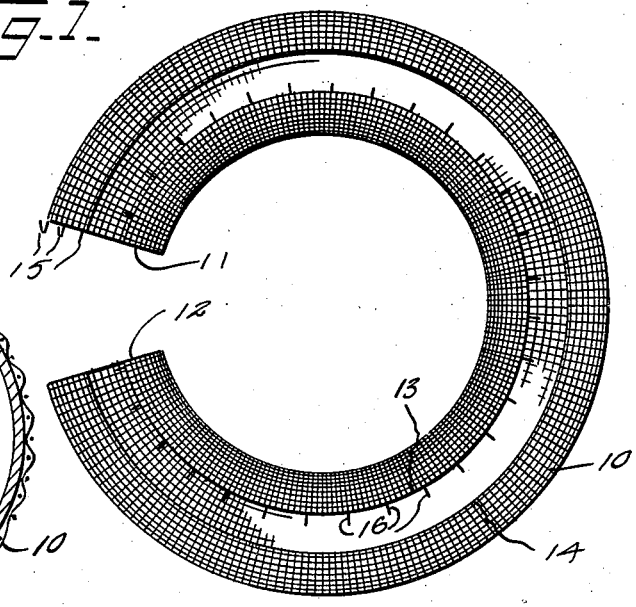
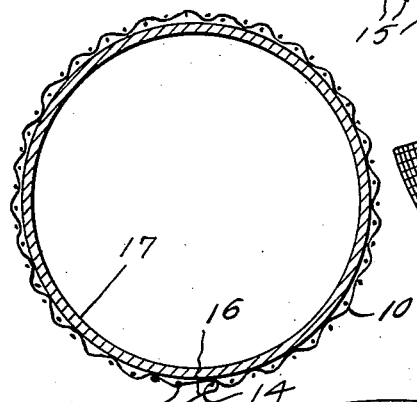
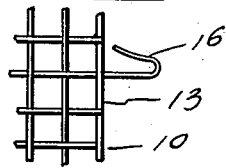
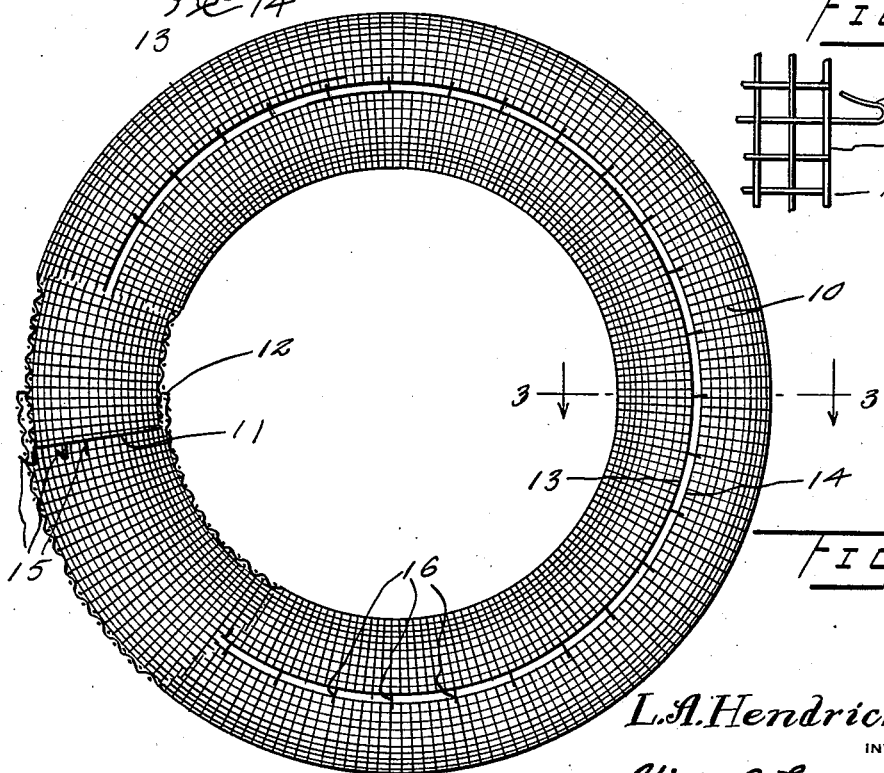
L. A. Hendrickson
INVENTOR
BY Victor J. Evans & Co.
ATTORNEYS Patented Jan. 6, 1942

2,268,548

UNITED STATES PATENT OFFICE 2,268,548

INNER TUBE TESTER

Lauri A. Hendrickson, Friendship, Maine

Application August 11, 1941, Serial No. 406,386

1 Claim. (Cl. 73—51)

This invention relates to an inner tube tester and has for an object to provide a simplified form of testing jacket which will permit the inner tube to be easily inserted therein, which will be circumferentially adjustable to receive inner tubes of various diameters, and which will permit increased visibility due to the absence of separate clamps, when the device with an inner tube therein is immersed in water to detect a leak.

A further object is to provide an inner tube tester which will be sufficiently strong to enclose truck tire inner tubes and permit the inner tube being inflated to the required tire pressure without danger of the tube being ruptured while a pressure leak is being found.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a side elevation of an inner tube tester constructed in accordance with the invention showing the telescopic ends and the side of the tester open to permit insertion of an inner tube.

Figure 2 is a side elevation of the tester showing the ends and side closed to form an annular jacket for the inner tube to be tested.

Figure 3 is a cross sectional view taken on the line 3—3 of Figure 2 drawn to large scale and showing an inner tube in the tester.

Figure 4 is a detail perspective view showing one of the fastening hooks of the tester.

Referring now to the drawing in which like characters of reference designate similar parts in the various views, 10 designates a resilient metal mesh annular jacket similar in shape to the shape of an automobile inner tube and adapted to envelope an inner tube somewhat in the same manner as a tire casing to permit the inner tube to be inflated to required tire pressure and in such condition submerged, with the jacket confining it against rupture, in water so that a pressure leak may be discovered by noting the bubbles rising therefrom.

The annular mesh jacket 10 is split transversely to provide ends 11 and 12 which telescopically fit each other to close the split or gap between the ends. The telescopically assembled ends permit of the annular jacket being retracted circumferentially or extended circumferentially to receive inner tubes of various sizes. The annular jacket 10 is also split circumferentially to provide circumferential ends 13 and 14 which are so spaced apart that an inner tube may be easily inserted through the space or open side of the annular jacket for confinement in the jacket.

The terminal ends 11 and 12 are detachably connected together by hooks 15 carried by one of the ends and engageable in the mesh of the other end. The circumferential ends 13 and 14 are detachably secured together by hooks 16 carried by one of the ends and engageable in the mesh of the other end to close the side gap or space in which the inner tube is inserted in the jacket. Preferably the hooks are formed from the material of the mesh so that welding may be dispensed with if desired.

In operation the inner tube 17 is inserted in the tester and the hooks moved to connect the ends 11 and 12 and the circumferential edges 13 and 14. The tube, confined within the tester, may be inflated to any desired pressure without danger of rupture or injury from high inflation. When the inflated tube, confined within the tester, is immersed in a tank of water, the high pressure in the tube opens even the smallest holes in the tube wall and allows bubbles of air to pass freely. The tester being formed of resilient metal mesh permits complete visibility so that the rising bubbles may be easily detected.

From the above description it is thought that the construction and operation of the invention will be fully understood without further explanation.

What is claimed is:

An inner tube tester comprising, an annular metal mesh jacket similar in shape to the shape of an inner tube, the jacket being split transversely to provide terminal ends which telescopically fit each other so that the jacket may be retracted circumferentially or extended circumferentially to receive inner tubes of various sizes, the jacket also being split circumferentially to provide circumferential ends which are so spaced apart than an inner tube may be easily inserted through the space or open side of the annular jacket for confinement in the jacket, integral hooks formed of the material of the mesh on one of the terminal ends engageable in the mesh of the other terminal end, and integral hooks formed of the material of the mesh on one of the circumferential ends engageably in the mesh of the other circumferential end.

LAURI A. HENDRICKSON.